United States Patent [19]

Ehrfeld et al.

[11] Patent Number: 4,797,211
[45] Date of Patent: Jan. 10, 1989

[54] CROSS FLOW MICROFILTER

[75] Inventors: Wolfgang Ehrfeld, Karlsruhe; Dietrich Münchmeyer, Stutensee, both of Fed. Rep. of Germany

[73] Assignee: Kernforschungszentrum Karlsruhe GmbH, Karlsruhe, Fed. Rep. of Germany

[21] Appl. No.: 945,882

[22] Filed: Dec. 24, 1986

[30] Foreign Application Priority Data

Dec. 24, 1985 [DE] Fed. Rep. of Germany ....... 3546091

[51] Int. Cl.⁴ .............................................. B01D 13/00
[52] U.S. Cl. ............................... 210/321.84; 210/456; 210/500.25; 210/500.26
[58] Field of Search .................. 264/22; 210/498, 456, 210/636, 500.25, 500.26, 321.84

[56] References Cited

U.S. PATENT DOCUMENTS 3,303,254 2/1967 Simons ........................... 210/498 X
3,438,504 4/1969 Furman ........................... 264/22 X
4,110,220 8/1978 Lavender ........................ 210/456 X
4,405,688 9/1983 Lowery et al. ............. 264/177.14 X
4,579,662 4/1986 Jonsson ................................ 210/636

OTHER PUBLICATIONS

A. E. Ostermann, Cross Flow Microfiltration in Industrial Use–Overview of Present Materials for Seminar No. 116125, Technical Academy, Wuppertal, May 1985.
E. W. Becker, W. Ehrfeld, P. Hagmann, A. Maner, D. Munchmeyer, KFK Report No. 3995 by Kernforschungszentrum Karlsruhe (Nov., 1985).
Nuclepore, Falkenweg 47, Nuclepore Membrantechnologie.

Primary Examiner—Frank Spear
Attorney, Agent, or Firm—Spencer & Frank

[57] ABSTRACT

A cross flow microfilter comprises a filter housing having a flow chamber wherein a fluid is introduced on one side and a concentrate is removed on the opposite side a collection chamber from which a filtrate is removed, and at least one microporous membrane over whose one surface the fluid to be filtered flows in a parallel stream and whose other surface is oriented toward the collection chamber, the membrane having pores of a width between about 0.1 micron and 30 micron, the improvement wherein the pores of the membrane have slit-shaped cross-sections and given profiles, and are formed by a plurality of webs arranged in rows with predetermined spacing and by terminating plates which cover the webs, and the webs are applied onto one of the two plates by X-ray lithographic means, X-ray depth lithographic-galvanoplastic means, or molding and galvanoplastic means.

7 Claims, 3 Drawing Sheets

CROSS FLOW MICROFILTER

BACKGROUND OF THE INVENTION

1. Field of the Invention

The present invention relates to a cross flow microfilter.

2. Description of the Background

Cross flow microfilters serve to separate or enrich suspended or emulsified particles from or in a solution such as finely dispersed precipitation products in chemical processes, microorganisms or cellular components. Either the filtrate or the solution enriched with suspended or emulsified particles may be the desired product in different applications.

The filters utilize porous membranes which are primarily made of plastic, sintered glass or sintered metal. These membranes are used as the filtering elements.

The membranes are made of various materials having their own characteristic pore size distributions. Typical membrane pore size distributions for, e.g., polypropylene materials lie between about 0.5 $\mu$m and 1 $\mu$m and for sintered glass between 3 $\mu$m and 10 $\mu$m.

The total porosity is also material specific and lies typically between about 20% and 50% for sintered metal, at about 60% for sintered glass and between about 60% and 85% for plastics such as low pressure polyethylene, polypropylene, polytetrafluoroethylene (see, e.g., A.E. Ostermann, Cross Flow Microfiltration In Industrial Use—Overview Of Present Materials And Examples For Use In Connection With Waste Water Recycling And Chemical Process Technology, lecture materials for Seminar No. 116125, Technical Academy, Wuppertal, May 1985).

Such membranes have relatively high flow resistance in spite of their high total porosity. The reduction of the flow resistance by reducing the thickness of the membranes is possible only within certain limits for various reasons. A minimum thickness must be provided, particularly in order to assure with sufficient certainty that the membrane will not be transversed over its entire thickness by individual channels whose openings are too large. Another reason for this is that large opening channels inevitably occur locally in membranes on the basis of statistical pore size distributions specific to the manufacturing process.

The membrane must also have sufficient thickness in order to attain a minimum strength. So-called nuclear track membranes such as the ones being manufactured by the firm Nuclepore have uniformly sized pore openings. These membranes also have relatively high flow resistance due to their poor transparency or ratio of the sum of the pore cross-sections to the total surface of the membrane.

SUMMARY OF THE INVENTION

It is an object of the present invention to configure a membrane in a cross flow microfilter with uniform and predeterminable pore widths. This membrane has high transparency and thus low flow resistance.

The above and other objects are attained by a cross flow microfilter comprising a filter housing having a flow chamber wherein a fluid is introduced through at least one inlet and a concentrate is removed through at least one outlet on the side opposite the inlet, a collection chamber from which a filtrate is removed and at least one microporous membrane disposed between the flow chamber and the collection chamber, said membrane having an inlet surface along which the fluid to be filtered flows, an outlet surface oriented toward the collection chamber and pores of a width between about 0.1 micron and 30 microns, the improvement wherein said membrane comprises a plurality of webs disposed in at least one row and spaced at a predetermined distance from one another to define openings having slit-shaped cross-sections and given profiles and constituting said pores;

said microfilter further comprises two terminating plates enclosing said webs and laterally bounding said openings; and said webs are formed on one of said plates by X-ray lithography, X-ray depth lithographic-galvanoplasty, molding, or molding and galvanoplasty.

DESCRIPTION OF THE INVENTION

The present invention provides a novel membrane having webs that are fixed by terminating plates for use instead of previously employed membranes of transverse flow micro-filters. The profiles of the membrane webs and particularly their mutual spacing is predeterminable with great precision for even very small dimensions. These spacings define the pore width and can be set as small as about 0.1 $\mu$m. Various materials can be used for the present membrane. One example is that of plastic materials. In addition thereto, electrochemically precipitatable metals, metal alloys, ceramic materials and glasses can also be used as materials for the membranes.

The manufacture of such fine structures by X-ray lithographic and galvanoplastic means [Liga technology] and the shaping technique derived therefrom as defined herein are described and illustrated, inter alia, in KFK Report No. 3995 by Kernforschungszentrum Karlsruhe (Nov., 1985).

According to the invention, an irradiation technique is provided whereby an X-ray sensitive positive resist material is applied, e.g., to a metal base plate which is partially irradiated through a mask with X-rays, and then developed. In this manner, a negative mold of the webs to be formed is attained. The height of the mold corresponds to the layer thickness of the positive resist material. The height may be up to about 2 mm depending on the penetration depth of the X-rays. Preferably, the height is between about 0.1 mm and 2 mm. Thereafter, the negative mold is electrochemically filled with a metal by employing the base plate as the electrode. Thereafter, the remaining resist material is removed by means of a solvent.

In a separate molding technique, a positive of the desired web structure produced according to the Liga technology is employed as a re-usable tool. The reusable positive mold is then used as a mold for a plastic. The resulting negative molds are filled with metal by electroplating and then the remaining plastic is removed.

In both cases whether by using the irradiation technique or the molding technique extremely precise and fine structures can be produced which have lateral dimensions (width) in the $\mu$m range and freely selectable heights up to about 2 mm. Minimum lateral dimensions in the submicron range can be attained with somewhat lower heights.

A particularly well suited radiation source for use in the present invention is X-ray radiation from an electron synchrotron (synchrotron radiation). In the simplest case a partially irradiated and developed resist layer or a molded plastic layer, respectively, may be used directly to produce the membrane or as the membrane itself.

A more complete appreciation of the invention and many of the attendant advantages thereof will be readily perceived as the same becomes better understood by reference to the following detailed description when considered in connection with the accompanying figures.

Other objects, advantages and features of the present invention will become apparent to those skilled in the art from the following discussion.

DESCRIPTION OF THE PREFERRED EMBODIMENTS

Figure 1:
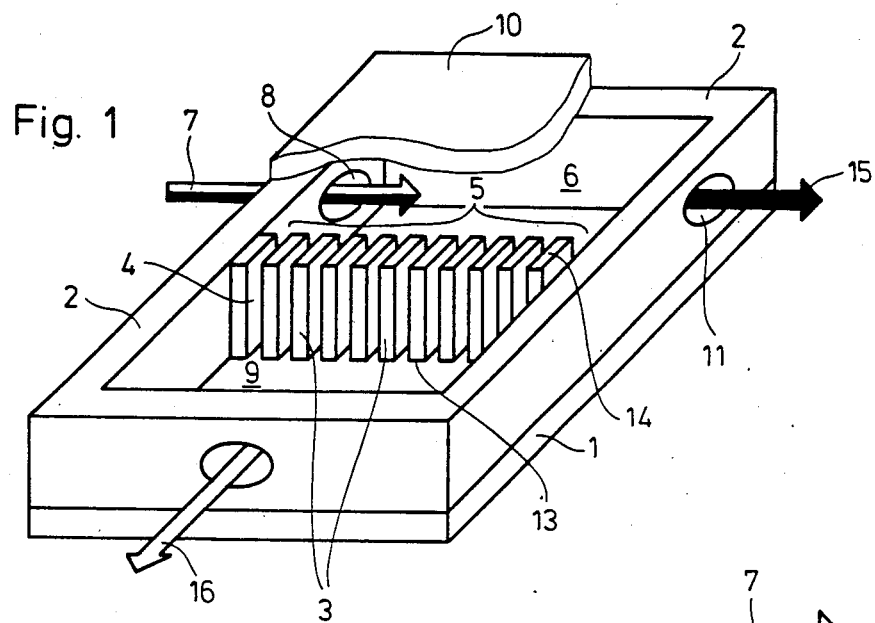
FIG. 1 is a perspective view of a particularly simple example of a transverse flow microfilter according to the invention.

A base plate 1 made of nickel can be seen in FIG. 1. Delimiting walls 2 and a plurality of fine webs 3 also made of nickel are produced on the base plate by way of X-ray lithography and a galvanoplastic process.

The fine webs 3 have a height of about 0.5 mm, a web width of about 3 $\mu$m and a mutual spacing of likewise about 3 $\mu$m. The webs adhere firmly with their lower frontal face 13 to the base plate 1 which serves as the terminating plate. Slits 4 between the webs 3 form the pores of membrane 5. The length of each web, i.e. the dimension in the direction of flow through the membrane is about 20 $\mu$m.

A fluid 7 to be filtered flows in flow chamber 6 over the membrane 5 from intake side 8 to side 11 opposite thereto where the concentrate 15 is removed. The membrane 5 separates the flow chamber 6 from collection chamber 9 where the filtrate 16 is discharged. Delimiting walls 2 define the external sides of the flow chamber 6 and the collection chamber 9.

The cross flow microfilter is completed by an upper terminating plate 10 also made of nickel which covers the upper frontal faces 14 of the webs 3. The connections are made by means of diffusion soldering.

Figure 2:
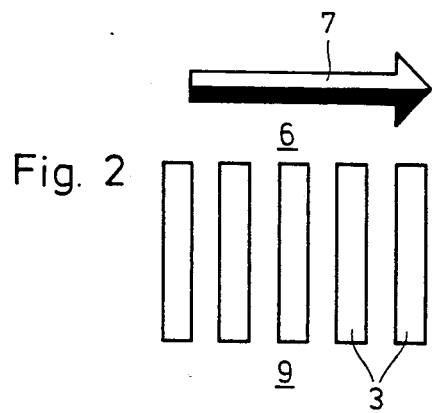
FIGS. 2 to 4 are views of advantageous profiled shapes of the webs of membrane 5.

A simple embodiment of the transverse flow microfilter of the invention is shown in FIG. 2. The webs 3 in this embodiment have a rectangular cross-section and are arranged at an angle of about 90° with respect to the direction of the flow of the fluid 7 in the flow chamber 6.

Figure 3:
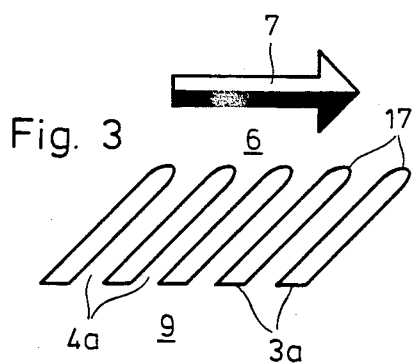

The webs 3a of FIG. 3, however, have their narrow sides 17 facing the stream, rounded. The webs are set at an angle of about 135° against the direction of the flow of the fluid 7. This results in a reduction of the risk of clogging of slits 4a which serve as pores. In addition, this also results in a reduction on its influence on the flow of the fluid.

Figure 4:
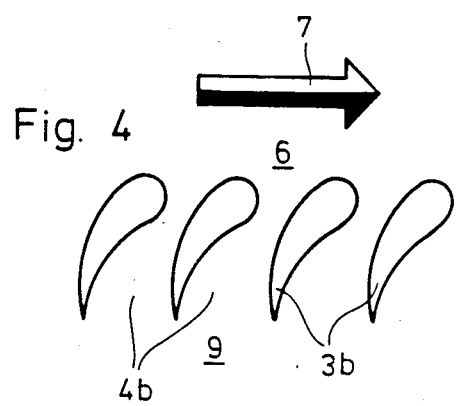

Another advantageous web profile according to the invention is shown in FIG. 4. In this embodiment, the webs 3b have a curved profile and the cross-sections of the slits 4b become larger toward the collection chamber 9.

Figure 5:
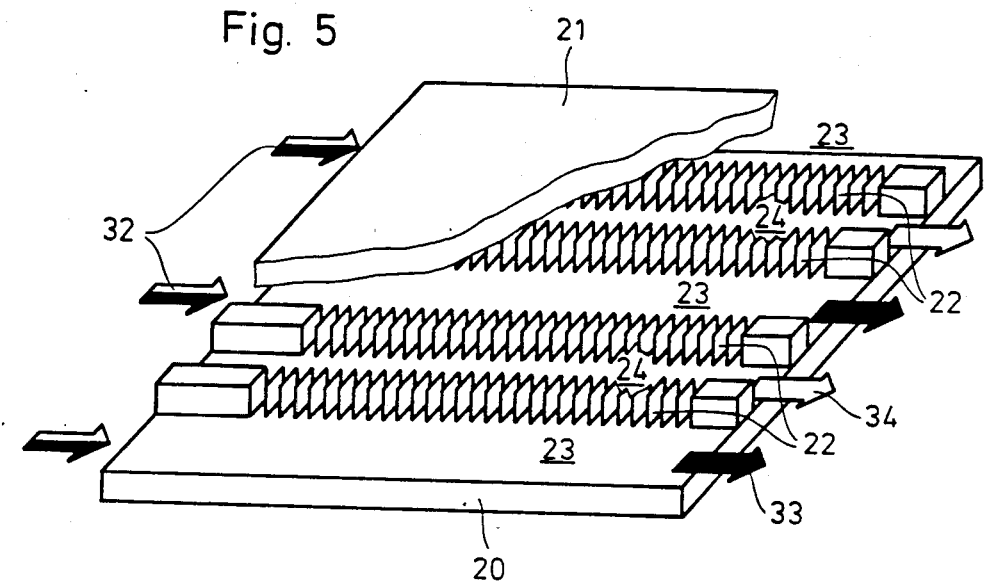
FIG. 5 is a perspective view of another embodiment of the transverse microfilter of the invention.

A plurality of row-like web arrangements 22 can be seen in FIG. 5 between the two common terminating plates 20, 21. In this embodiment, two adjacent web arrangements 22 are oriented as a mirror image to one another. They enclose flow chambers 23 and collection chambers 24 between them.

Each individual flow chamber 23 receives the fluid 32 to be filtered from one side and discharges the concentrate 33 from the opposite side. The filtrate 34 is also discharged from collection chambers 24 on the opposite side.

It is herein also provided the use of intake distributors and concentrate collectors to connect the individual flow chambers 23 to a common intake conduit 25 or to a common concentrate line.

Figure 6:
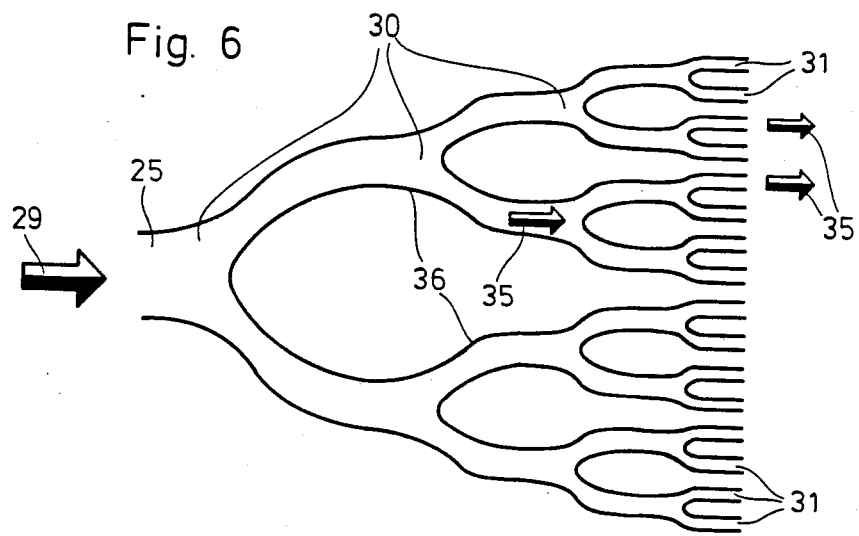
FIG. 6 is a schematic top view of an intake distributor according to the invention which can be connected to the microfilter of FIG. 5.

A cross-sectional view of a preferred embodiment of an intake distributor of this invention is shown in Figure 6. The main stream 29 can be seen to repeatedly branch out 30. The last branches 31 are each separately connected to a flow chamber 23 of FIG. 5. The branches 30 are given a flow enhancing configuration so that neither greater shear stresses nor dead spots occur. The individual streams 35 are guided through partitions 36.

This embodiment of the invention is particularly suitable for biological and medicinal uses such as is the case with a fluid which needs to be filtered where cellular components of the fluid must not be damaged.

A special and particularly interesting application of the present invention can be found in the separation of blood plasma from human blood. When applied to this particular end the concentrate collector may, in addition, also have a mirror image configuration.

The processes described hereinabove for the manufacture of the membrane are particularly well suited for the production of cross flow microfilters and flow distributors according to the invention which are made of biologically compatible materials such as noble metals or hydrogels.

Figure 7:
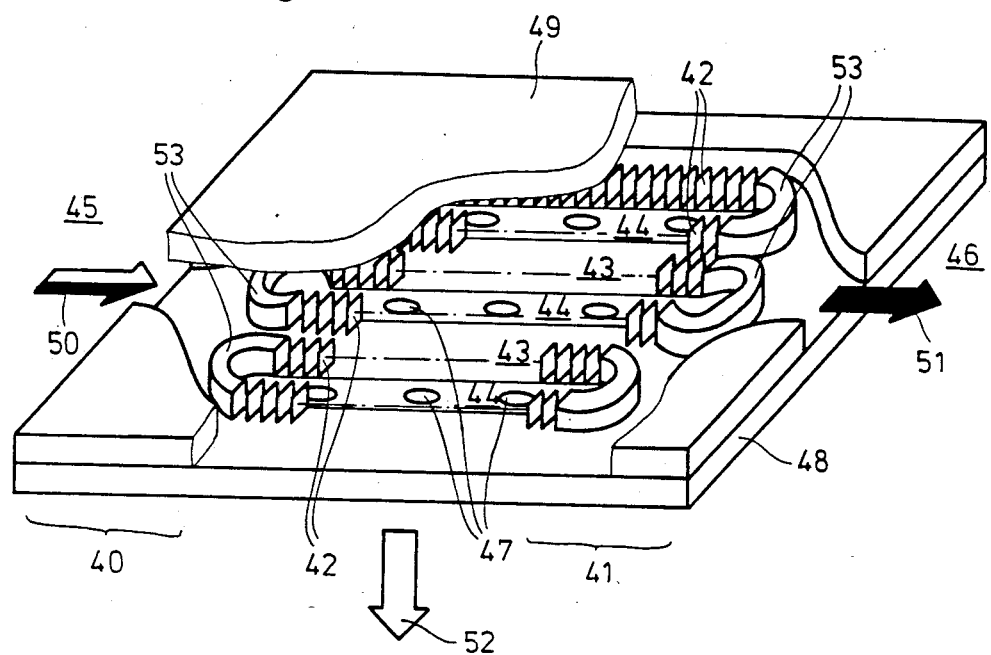
FIG. 7 is a perspective view of an integrated arrangement of another embodiment of the invention.

An integrated arrangement of an intake distributor 40 is shown in FIG. 7. The arrangement is composed of partitions 53, a corresponding concentrate collector 41, and a plurality of row-like web arrangements 42 as membranes which enclose between themselves flow chambers 43 and collection chambers 44. The entire arrangement is covered by two common cover plates 48, 49. The connection for the fluid 50 to be filtered and for the concentrate 51 is made at opposite sides 45, 46.

The filtrate 52 is removed from the collection chambers 44 through bores 47 in the cover plate 48. This compact, integrated cross flow microfilter is of great interest particularly with respect to the development of hemofiltration units.

The present invention is not limited to the embodiments described above. Other adaptations of the same principles are also contemplated within the confines of the invention.

Examples of such adaptations are microfilters suited for the practice of multi-stage transverse flow microfiltration. The fluid to be filtered is herein prefiltered in a first stage having membranes with a larger slit width. The fluid is then further purified in one ,or a plurality of subsequently connected stages employing membranes having finer slit widths. In this embodiment of the invention, the profiles and mutual spacing of the webs within a membrane can also be varied to be adapted to specific characteristics, e.g., viscosity, which change along the path of the flow of the fluid.

The present disclosure relates to the subject matter disclosed in German patent application, Ser. No. P No. 35 46 091.1 of Dec. 24th, 1985, the entire specification of which is incorporated herein by reference.

The invention now being fully described, it will be apparent to one of ordinary skill in the art that many changes and modifications can be made thereto without departing from the spirit or scope of the invention as set forth herein.

The membranes are formed by means of X-ray lithography, X-ray lithograpy-galvanaoplasty(-electrodeposition), molding or molding and galvanoplasty. These process.are described in detail in KfK Report No. 3995 by Kernforschungszentrum Karlsruhe (November 1985).

What is claimed is:

1. In a cross flow microfilter comprising a filter housing having a flow chamber wherein a fluid is introduced through at least one inlet and a concentrate is removed through at least one outlet on the side opposite the inlet, a collection chamber from which a filtrate is removed, and at least one microporous membrane disposed between the flow chamber and the collection chamber, said membrane having an inlet surface along which the fluid to be filtered flows, an outlet surface oriented toward the collection chamber and pores of a width between about 0.1 micron and 30 microns, the improvement wherein said membrane comprises a plurality of webs disposed in at least one row and spaced at a predetermined distance from one another to define openings having slit-shaped cross-sections said openings having uniform and predetermined widths and given profiles and constituting said pores;

said microfilter further comprises two terminating plates enclosing said webs and laterally bounding said openings; and said webs are formed on one of said plates by one of X-ray lithography, X-ray depth lithographic-galvanoplasty molding, and molding with subsequent galvanoplasty.

2. The cross flow microfilter of claim 1, wherein the webs are arranged in the flow chamber so that the direction of flow through the pores is at an angle of between about 90° to 135° with respect to the direction of flow of the fluid along the inlet surface.

3. The cross flow microfilter of claim 1, wherein the side of each web adjacent the flow chamber is rounded.

4. The cross flow microfilter of claim 1, wherein the webs have a height between the plates between about 0.1 mm and 2 mm.

5. The cross flow microfilter of claim 1, wherein said webs are arranged in a plurality of pairs of rows between the two plates; and within every pair of web rows, the web rows are oriented as a mirror image to one another in such a manner that they enclose therebetween a respective one of said chambers.

6. The cross flow microfilter of claim 5, wherein said flow chamber has a plurality of inlets and a plurality of outlets, and further comprising an intake distributor and a concentrate collector, each having a plurality of branching points including end branches, each end branch of said intake distributor being connected to a respective inlet of the flow chamber and each end branch of said concentrate collector being connected to a respective outlet of the flow chamber; and wherein said intake distsributor and said concentrate collector each further has two plates, and a plurality of partition walls, said partition walls having given profiles and being disposed at given positions between said walls.

7. The cross flow microfilter of claim 6, wherein each said plate of said distributor and of said collector is integral with a respective terminating plate of said microfilter, said partitions are formed on said plate of said distributor and said plate of said collector which are integral with said one terminating plate, and said partitions are covered by the other said plate of said distributor and said collector.

* * * * *